United States Patent
Iverson et al.

(10) Patent No.: US 8,623,792 B2
(45) Date of Patent: Jan. 7, 2014

(54) ZERO SHEAR VISCOSIFYING AGENT

(75) Inventors: Benjamin J. Iverson, Duncan, OK (US); Ashok K. Santra, Duncan, OK (US); Priscilla T. Reyes, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/485,054

(22) Filed: May 31, 2012

(65) Prior Publication Data

US 2012/0238663 A1    Sep. 20, 2012

Related U.S. Application Data

(62) Division of application No. 12/730,419, filed on Mar. 24, 2010.

(51) Int. Cl.
   *C09K 8/88* (2006.01)

(52) U.S. Cl.
   USPC ........................................ 507/219; 166/305.1

(58) Field of Classification Search
   USPC ........................................ 507/219; 166/305.1
   See application file for complete search history.

(56) References Cited

U.S. PATENT DOCUMENTS

| | | | | |
|---|---|---|---|---|
| 3,035,004 | A * | 5/1962 | Glavis | 524/522 |
| 5,629,373 | A * | 5/1997 | Glancy et al. | 524/512 |
| 7,056,868 | B2 | 6/2006 | Benton et al. | |
| 2002/0006985 | A1 | 1/2002 | Sau | |
| 2006/0270563 | A1 | 11/2006 | Yang et al. | |
| 2006/0289163 | A1 * | 12/2006 | Lecolier et al. | 166/293 |

FOREIGN PATENT DOCUMENTS

| | | |
|---|---|---|
| DE | 10021476 A1 | 10/2001 |
| WO | WO 9640625 A1 * | 12/1996 |

OTHER PUBLICATIONS

Official Action for Australian Patent Application No. 2011231414 dated May 7, 2013.

* cited by examiner

*Primary Examiner* — Alicia Bland
(74) *Attorney, Agent, or Firm* — Craig W. Roddy; McDermott Will & Emery LLP

(57) ABSTRACT

A treatment fluid comprising an aqueous liquid and an associative polymer additive. The associative polymer additive increases the plastic viscosity (PV) of an aqueous liquid by more than at least 50% and wherein the associative polymer additive increases the yield point (YP) by no more than about 30% of the corresponding increase in the PV relative to an aqueous liquid without the associative polymer additive. Moreover, the viscosity of the aqueous liquid comprising the associative polymer additive is capable of maintaining a viscosity of greater than about 20 cP for at least 20 minutes at temperatures higher than about 275° F. In some cases the associative polymer additive may be a hydrophobic alkoxylated aminoplast.

11 Claims, 1 Drawing Sheet

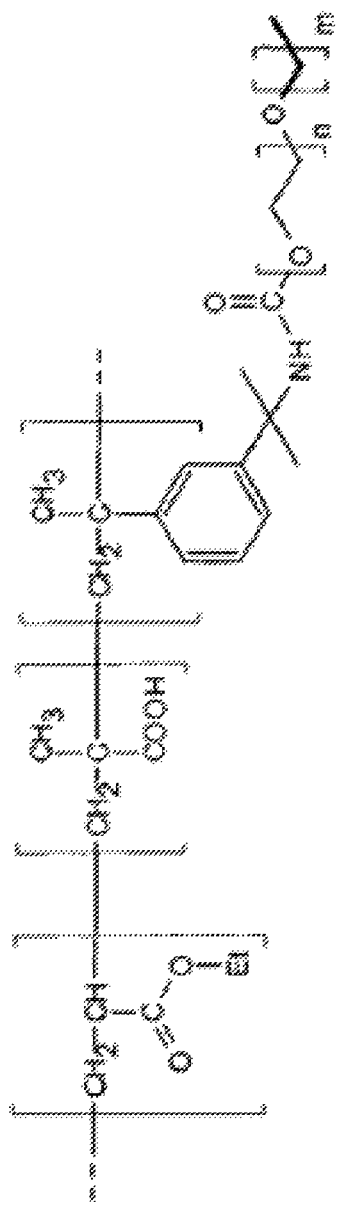

ZERO SHEAR VISCOSIFYING AGENT

This application is a divisional of U.S. patent application Ser. No. 12/730,419 by Benjamin J. Iverson, filed on Mar. 24, 2010, entitle "Zero Shear Viscosifying Agent," and published as US 2011/0232905.

BACKGROUND

This invention is generally related to methods and compositions for treating subterranean formations, and more particularly to treatment fluids having additives that modify the fluid's rheological characteristics.

Polymeric agents, such as cationic polymers, high molecular weight polyacrylamide polymers, polysaccharides, synthetic polymers, and the like, have previously been added to treatment fluids to obtain the desired properties for a variety of subterranean treatments. Such treatments include, but are not limited to, drilling, stimulation treatments (e.g., fracturing treatments, acidizing treatments, etc.), and completion operations (e.g., cementing, sand control treatments like gravel packing, etc.). As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

Traditional treatment fluids may be grouped into two classifications. Such classifications include oil-based treatment fluids and aqueous-based treatment fluids. While oil-based treatment fluids can have superior performance characteristics, aqueous-based treatment fluids may be more economical to use and less damaging to the formation and to the environment.

It is often important to consider a fluid's rheological parameters when assessing the utility of a treatment fluid for a given purpose. For use as a subterranean treatment fluid, a fluid generally should be capable of maintaining a viscosity suitable for the desired operation. For example, a drilling fluid preferably has a sufficient viscosity to be capable of transporting the drill cuttings to the surface without being so viscous as to interfere with the drilling operation. Similarly, a cementing fluid preferably has a viscosity sufficient to prevent separation of solid cement components from the liquid components for a sufficient time to allow the cement to set. However, increased fluid viscosity (e.g., cement viscosity, drilling fluid viscosity, etc.) can result in problematic sticking of the drill string and increased circulating pressures that may contribute to lost circulation problems in the formation. Solid particles such as various clays are commonly used as a way to maintain sufficient viscosity in such treatment fluids. These solid particles may require vigorous agitation in the fluid to reach a fully active state and provide an increase in viscosity. Time pressures may demand that fluids be prepared quickly for shipment to the drilling operation. As a result, inadequate shear and over-treatment may occur when using solid particles. Additionally, solid particles may affect both the viscosity of the fluid and the fluid's yield point, which is a measure of the initial force required to cause the fluid to flow.

In addition to prevent separation of solid cement components from the liquid components under both dynamic and static conditions, the cementing fluids should possess a low enough viscosity while under shear (during pumping) so that efficient placement of such fluids even in the narrower annulus could be achieved, cases may be anticipated due to highly eccentric casing placement.

Aqueous treatment fluids which do not contain solid particles may offer many advantages if they can retains the performance of an oil-based treatment fluid while maintaining the many of the benefits of using an aqueous-based treatment fluid.

SUMMARY

This invention is generally related to methods and compositions for treating subterranean formations, and more particularly to treatment fluids having additives that modify the fluid's rheological characteristics.

Some embodiments of the present invention provide methods comprising providing a treatment fluid comprising an aqueous fluid and an associative polymer additive, wherein the associative polymer additive increases the PV of the treatment fluid by more than at least 50% and wherein the associative polymer additive increases the yield point by no more than about 30% of the corresponding increase in the PV relative to a treatment fluid without the associative polymer additive; and placing the treatment fluid in at least a portion of a subterranean formation.

Other embodiments of the present invention provide methods comprising providing a treatment fluid comprising an aqueous fluid and an associative polymer additive, wherein the associative polymer additive comprises hydrophobic alkoxylated aminoplast; and placing the treatment fluid in at least a portion of a subterranean formation.

Still other embodiments of the present invention provide compositions comprising an aqueous base fluid; an associative polymer additive comprising a hydrophobic alkoxylated aminoplast; and at least one compound comprising an additive selected from the group consisting of: a proppant particulate, a cement, a drill cutting, a salt, or a combination thereof.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention.

FIG. 1 shows the chemical composition of HASE polymers bearing n-alkyl hydrophobes.

DETAILED DESCRIPTION

This invention is generally related to methods and compositions for treating subterranean formations, and more particularly to treatment fluids having additives that modify the fluid's rheological characteristics.

While the methods and fluids of the present invention have many advantages, only some will be discussed herein. One of the many potential advantages of the methods and compositions of the present invention is that they may have improved suspension characteristics due to the formation of an associative polymer network. For example, the addition of an associative polymer additive may increase the viscosity of the treatment fluid without a corresponding increase in the yield point of the fluid. Examples of treatment fluids useful in conjunction with the present invention may include: drilling fluids, drill-in fluids, cements, fracturing fluids, spacer fluids between different fluid types (cement and drilling fluid, for example), viscous packer fluids for suspending well operations, high-viscosity sweep fluids to aid in cuttings transport, and other various tasks requiring viscous fluids. The increase in the viscosity of the fluid may aid in suspension of particles within the fluid (e.g., proppant particulates in a fracturing fluid or cementing solids in a cement composition). In an embodiment, a fluid of the present invention may demonstrate an increased viscosity without a corresponding increase in the yield point, and the fluid may exhibit the increased viscosity without the need for solid additives, such as weighting agents or organophilic clays.

For the purposes of describing the treatment fluids of the present invention, it is useful to describe certain rheological properties including yield point ("YP"), low-shear viscosity, plastic viscosity ("PV"), the equivalent circulating density ("ECD"), and yield stress (tau zero). The YP is defined as the yield stress obtained from the Bingham-Plastic rheological model when extrapolated to a shear rate of zero. It may be calculated using 300 revolutions per minute ("rpm") and 600 rpm shear rate readings on a standard oilfield rheometer. Similarly, the yield stress, or tau zero, is the stress that must be applied to a material to make it begin to flow (or yield), and may commonly be calculated from rheometer readings measured at rates of 3, 6, 100, 200, 300 and 600 rpm. The extrapolation to determine yield stress may be performed by applying a least-squares fit or curve fit to the Herschel-Bulkley rheological model. A more convenient means of estimating the yield stress is by calculating the low-shear yield point ("LSYP") by the same formula shown below in Equation 2 though with the 6 rpm and 3 rpm readings substituted for the 600- and 300-rpm readings, respectively. PV represents the viscosity of a fluid when extrapolated to infinite shear rate and may also be referred to as $\mu_{inf}$. The PV and YP are calculated by the following set of equations:

$$PV = (600 \text{ rpm reading}) - (300 \text{ rpm reading}) \quad \text{(Equation 1)}$$

$$YP = (300 \text{ rpm reading}) - PV \quad \text{(Equation 2)}$$

The ECD is the effective circulating density exerted by a fluid against the formation or casing taking into account the flow rate and pressure drop in the annulus above the point being considered. A high PV may increase the ECD due to a greater pressure drop in the annulus caused by internal fluid friction.

These rheological properties may be measured using standard testing procedures and standard testing equipment known to those skilled in the art. For example, properties such as plastic viscosity expressed in centipoises, low-shear viscosity expressed in dial readings, yield point and LSYP expressed in lb/100 ft$^2$, and gel strength expressed in lb/100 ft$^2$ may be determined by the "ANSI/API RP 10B: Recommended Practice for Field Testing Oil-based Drilling Fluids," using a 115-volt motor-driven viscometer, such as a FANN Model 35-A V-G Meter, which is incorporated herein by reference in its entirety. The rotational measurements represent standard rates at which readings may be taken. Actual rotational rates may vary slightly and may be corrected using correction factors, if necessary.

The treatment fluids of the present invention comprise an aqueous base fluid and an associative polymer additive. In some embodiments, the associative polymer additive may comprise residual monomers from the production of the associative polymer additive. An associative polymer network may be formed by the association and networking of the molecules of the associative polymer additive polymers within the aqueous fluid. Optionally, the treatment fluids of the present invention may comprise additional components.

The aqueous base fluids used in embodiments of the treatment fluids of the present invention may be fresh water, salt water (e.g., water containing one or more salts dissolved therein), brine (e.g., saturated salt water), seawater, and any combinations thereof. The brines may contain substantially any suitable salts, including, but not necessarily limited to, salts based on metals, such as calcium, magnesium, sodium, potassium, cesium, zinc, aluminum, and lithium. The salts may contain substantially any anions, with preferred anions being less expensive anions including, but not necessarily limited to chlorides, bromides, formates, acetates, and nitrates. The choice of brine may alter the associative properties of the associative polymer additive in the treatment fluid. A person of ordinary skill in the art, with the benefit of this disclosure, will recognize the type of brine and ion concentration needed in a particular application of the present invention depending on, among other factors, the other components of the treatment fluids, the desired associative properties of such fluids, and the like. Generally, the aqueous fluid may be from any source, provided that it does not contain an excess of compounds that may adversely affect other components in the treatment fluid. The aqueous base fluid may be present in embodiments of the treatment fluids of the present invention in an amount in the range of about 5% to about 99% by weight of the treatment fluid. In certain embodiments, the base fluid may be present in the treatment fluids of the present invention in an amount in the range of about 10% to about 90% by weight of the treatment fluid.

The treatment fluid of the present invention also comprises an associative polymer additive. As used herein, an "associative polymer additive" refers to a hydrophobically modified water-soluble polymer capable of interacting in an aqueous solution with itself and with other species to form an associative network. The associative polymer additive may generally comprise a water-soluble polymer backbone coupled to at least one hydrophobic segment. In certain embodiments, the associative polymer may be a linear or branched. In some instances, linear polymer backbones may have better associative properties since they may be able to fold back and forth with less steric hindrance. An associative network formed by the interaction of the associate polymer additive molecules in an aqueous solution may act to modify the rheological properties of the treatment fluid. For example, the addition of an associative polymer additive may increase the viscosity of the treatment fluid without a corresponding increase in the yield point of the fluid. Such a modification may be used to make a fluid more closely modeled using a Newtonian fluid model or a power law model.

The associative polymer additive of the present invention should be added to the aqueous base fluid in an amount sufficient to form the desired associative polymer networks within the treatment fluid. In certain embodiments, the associative polymer additive may be present in amount in the range of about 0.01% to about 15% by weight of the treatment fluid. In certain embodiments, the associative polymer additive may be present in an amount of about 0.1% to about 4% by weight of the treatment fluid. A person of ordinary skill in the art, with the benefit of this disclosure, will recognize the necessary amount of associative polymer additive to include in a particular application of the present invention depending on, among other factors, the other components of the treatment fluids, the desired properties of the associative polymer networks in the treatment fluids, and the like.

In an embodiment, the associative polymer additive may have a molecular weight in the range from about 10,000 to about 10,000,000. In some embodiments, the molecular weight range from about 500,000 to about 1,500,000. In some embodiments, this molecular weight may vary between individual associative polymer additive molecules in the treatment fluid (e.g., a range of molecular weights may be present in a treatment fluid). One of ordinary skill in the art with the benefit of this disclosure will recognize the appropriate size for a given application.

Suitable associative polymer additives generally comprise hydrophobic alkoxylated aminoplast polymers such as hydrophobically modified ethoxylated urethanes (HEUR) or hydrophobically modified alkali-swellable emulsions (HASE), such as ethoxylated amnioplasts and polyethylene glycol substituted with an aminoplasts. An example of a chemical constitution of a suitable HASE polymer with an n-alkyl hydrophobe is shown in FIG. 1.

The hydrophobic alkoxylated aminoplast polymer may generally be non-ionic and may comprise a hydrophobic segment connected to an aminoplast through a coupling functional group. The water-soluble polymer backbone generally comprises an aminoplast. The aminoplast may optionally comprise additional functional groups. As used herein, an aminoplast refers to an A-stage class of thermosetting resin and is based on the reaction product of an amine with an aldehyde and/or the related acetals containing amines or amides. An aminoplast monomer may comprise an amino group that may be bonded to at least one alkylol or alkylol ether or ester functional group. The functional groups may impart reactivity to the aminoplast monomer, allowing for the aminoplast to participate in further reactions to form a hydrophobic alkoxylated aminoplast polymer. The skeletal unit of the aminoplast may comprise the structure of the aminoplast minus a leaving group bonded to the alkylene of the alkyol or alkylol ether or ester of the aminoplast, regardless of whether any of the leaving groups are removed from the aminoplast.

In some embodiments, the skeletal unit of the aminoplast may comprise at least two amino groups. The skeletal unit of the aminoplast may take part in a condensation reaction that may generate a low to moderate molecular weight polymer, a highly crosslinked polymer by homopolymerization or copolymerization, or a modification of the aminoplast skeletal unit to provide additional functional groups or remove some functional groups. In some embodiments, the aminoplast may be polymerized to form an aminoplast backbone with optional, additional functional groups attached to the aminoplast polymer.

In some embodiments, the hydrophobic alkoxylated aminoplast polymer comprises one or more hydrophobic segments. As used herein a hydrophobic segment may refer to the portion of the associative polymer additive having at least one hydrophobe. In an embodiment, the hydrophobe may comprise from 1 to 24 carbon atoms and may include saturate, unsaturated, aliphatic (including linear, cyclic, and branched aliphatic compounds or groups), and/or aromatic compounds or groups. Suitable hydrophobes may include, but are not limited to, linear or branched alkyl, alkenyl, cycloalkyl, aryl, alkaryl, aralkyl hydrocarbons, and halo-substituted alkyl, cycloalkyl, aryl, alkylaryl, acryloyl, arylakyl hydrocarbons, and mixtures thereof. While not wishing to be limited by theory, the hydrophobic segments are believed to form associations via, e.g., physical crosslinks, Van der Waals forces, and/or electrostatic interactions with each other or with additional components in the treatment fluid.

In some embodiments, the hydrophobic segment may be connected to the water-soluble polymer backbone through a coupling functional group. The coupling functional groups of the associative polymer additive may provide the reactivity and bonding sites to chemically bond the water-soluble polymer backbone to the hydrophobic segment. The coupling functional group may generally comprise any functional group capable of forming a bond between the water-soluble polymer backbone and a hydrophobe. The coupling functional group may include, but is not limited to, a group such as a hydroxyl, a carboxyl, an ether, an ester, a sulfhydryl, and an isocyanate, derivatives thereof, or combinations thereof. Other examples of the coupling functional group may include, but are not limited to, an amino group, an ethylenic unsaturated group, an epoxide group, a carboxylic acid group, a carboxylic ester group, a carboxylic acid halide group, an amide group, a phosphate group, a sulfonate group, a sulfonyl halide group, an organic silane group, an acetylene group, a phenol group, a cyclic carbonate group, an isocyanate group, and a carbodiimide group.

In some embodiments, the number of hydrophobic segments per associative polymer additive molecule should be sufficient to generate intermolecular interactions in an aqueous solution to allow for the formation of an associative polymer network. In an embodiment, the associative polymer additive may generally comprise at least 0.25 to about 25 hydrophobic segments per molecule. In some embodiments, the associate polymer additive may comprise from about 0.5 to about 10 hydrophobic segments per molecule. The number of hydrophobic segments per associative polymer additive molecule may be altered through variations in the reactant concentrations during manufacturing of the associative polymer additive.

In some embodiments, the hydrophobic segments on the associative polymer additive may comprise from about 5% to about 50% by weight of the total associative polymer molecule. In another embodiment, the hydrophobe portion of the associative polymer additive may comprise from about 10% to about 40% by weight of the total associative polymer molecule. As noted above, the weight fraction of the hydrophobe portion of the molecule should be sufficient to generate the desired intermolecular interactions between the associative polymer molecules in an aqueous solution.

The associative polymer additive that may be used to form the associative polymer networks of the present invention may be synthesized by incorporating hydrophobic segments within a water-soluble polymer backbone using any suitable method. Suitable methods include chain growth polymerization, step growth polymerization, and post-polymerization mechanisms for naturally occurring polymers and polymers that were made by chain or step growth polymerization. Specific examples may include, but are not limited to: reacting hydrophobes with a water-soluble polymer reactant containing coupling groups or corresponding coupling group precursors to form the associative polymer additive; reacting condensation monomers and/or prepolymers along with a coupling group precursor to form condensation polymers, wherein one of the reactants provides the requisite hydrophobe content on the final associative polymer additive; and reacting olefinically unsaturated monomers and/or prepolymers by addition polymerization, wherein at least one of the reactants contains the requisite hydrophobe content for the final associative polymer additive. In most instances, this is not a post-polymerization modification. Thus, the hydrophobic modification is incorporated within the polymer structure as it forms. However, in some instances, this modification may be performed post-polymerization, for example, through a suitable modification reaction. Residual monomer may remain in the polymer.

The degree of rheological modification attributable to the associative polymer additive may depend on a variety of factors, including, but not limited to, the degree of hydrophobic modification on the associative polymer additive, the microstructure of the associative polymer additive, and the concentration of the associative polymer additive in the treatment fluid. In certain embodiments, intrapolymer interactions may become more prominent at low polymer concentrations and high hydrophobic segment density along the water-soluble polymer backbone. In such embodiments, a compact, globular conformation may be formed giving rise to organized, hydrophobic microdomains in the network with micelle-like properties. In other embodiments, interpolymer interactions may be more prominent, usually at lower hydrophobe/water-soluble polymer backbone ratios and at higher associative polymer additive concentrations. A high associative polymer additive concentration may lead to chain overlap and hydrophobic clustering that increases the viscosity of the treatment fluid by forming an associative polymer network. One of ordinary skill in the art, with the benefit of this disclosure, will recognize the conditions necessary to obtain the proper intrapolymer and interpolymer associations to form the associative polymer networks of the present invention.

In some embodiments, the associative polymer additive may be used to change the rheological properties of a treatment fluid. In some embodiments, the associative polymer additive may increase the viscosity of the treatment fluid, as measured by the PV, without a corresponding increase in the yield point of the fluid. In some embodiments, the associative polymer additive may increase the PV of the treatment fluid while limiting the increase in the yield point by no more than about 30% of the corresponding increase in the PV. In some embodiments, the associative polymer additive may increase the PV of the treatment fluid by at least 50%. For example, if the associative polymer additive increases the PV of the treatment fluid by 100%, then the yield point would increase by no more than 30%. As an alternative example, if the associative polymer additive increases the PV of the treatment fluid by 300%, then the yield point would increase by no more than 90%. In another embodiment, the associative polymer additive may increase the PV of the treatment fluid while limiting the increase in the yield point by no more than about 20% of the corresponding increase in the PV.

While not intending to be limited by theory, it is believed that the associative polymer networks that form due to the associative polymer additive may help prevent the settling of particles in the treatment fluid when the fluid is at rest. It is believed that the associative bonds that form when the fluid is at rest may prevent particle settling, and thus, the formation of free water in the treatment fluid. The prevention of free water due to the formation of the associative polymer network may occur without a significant increase in the yield point of the treatment fluid. For example, a treatment fluid containing a cement may demonstrate a reduction in the formation of free water when the solution is not flowing; potentially increasing the final properties of the cement once it is set. In an embodiment, the treatment fluid may demonstrate at least a 30% reduction in free water, or alternatively a 40% reduction in free water, depending on the amount of associative polymer additive included in the treatment fluid.

Additional additives may be included in the treatment fluids of the present invention as desired for a particular application, including, but not limited to, surfactants, bridging agents, polyols, fluid loss control agents, pH-adjusting agents, pH buffers, shale stabilizers, combinations thereof, and the like. For example, polyols may be included in a treatment fluid and may improve thermal stability. Furthermore, a variety of additional additives suitable for use in the chosen operation may be included in the treatment fluid as deemed appropriate by one skilled in the art, with the benefit of this disclosure.

In some embodiments, the treatment fluids of the present invention may have increased thermal stability when in the presence of brine versus water. In certain embodiments, the increase in thermal stability can be attributed to the minimization of the hydrolytic attack due to decreased free water in the treatment fluid. In other embodiments, it is believed that the increase in thermal stability in aqueous base fluid may be due to changing the contact of the aqueous media with the backbone of the polymer chains, e.g., by facilitating the protection of the acetal linkage (e.g., 1,4-glycocidic linkage) of the backbone. The acetal linkage is thought to be generally unprotected in non-associated unmodified polymers.

In some embodiments, surfactants may be used to facilitate the formation of the associations. It is believed that the hydrophobic groups of the network forming polymers may become incorporated into surfactant micelles, which may act as a type of crosslinker. In certain embodiments, suitable surfactants may be a non-viscoelastic surfactant. Suitable surfactants may be anionic, non-ionic, cationic, or zwitterionic. Polymeric surfactants may also be used. Aqueous liquids containing the surfactants may respond to shear with a Newtonian or viscoelastic behavior. Anionic surfactants with Newtonian rheological behavior are preferred. Examples of suitable anionic surfactants include, but are not limited to, sodium decylsulfate, sodium lauryl sulfate, alpha olefin sulfonate, alkylether sulfates, alkyl phosphonates, alkane sulfonates, fatty acid salts, arylsulfonic acid salts, and combinations thereof. Examples of suitable cationic surfactants, include, but are not limited to, trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and combinations thereof. Preferably, the surfactant chosen should show Newtonian or viscoelastic behavior when present in water by itself in concentrations of less than 20%.

In certain other embodiments, the surfactant may be a viscoelastic surfactant. The viscoelastic surfactants used in the present invention may comprise any viscoelastic surfactant known in the art, any derivative thereof, or any combination thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. These viscoelastic surfactants may be cationic, anionic, nonionic, or amphoteric in nature. The viscoelastic surfactants may comprise any number of different compounds, including methyl ester sulfonates (e.g., as described in U.S. patent application Ser. Nos. 11/058,660, 11/058,475, 11/058,612, and 11/058,611, filed Feb. 15, 2005, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,879,699, the relevant disclosure of which is incorporated herein by reference. Suitable viscoelastic surfactants also may comprise "catanionic" surfactant systems, which comprise paired oppositely-charged surfactants that act as counterions to each other and may form wormlike micelles. Examples of such catanionic surfactant systems include, but are not limited to sodium oleate (NaO)/octyl trimethylammonium chloride (C8TAC) systems, stearyl trimethylammonium chloride (C18TAC)/caprylic acid sodium salt (NaCap) systems, and cetyl trimethylammonium tosylate (CTAT)/sodium dodecylbenzenesulfonate (SDBS) systems.

Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.). Where used, the surfactant may be included in the treatment fluid in an amount of about 0.1% to about 20% by weight of the treatment fluid. One should note that if too much surfactant is used that the formation of micelles in the fluid may negatively impact the overall fluid. Representative structures of suitable surfactants for use in the present invention are shown by FIG. 7.

The treatment fluids of the present invention optionally may comprise a pH buffer. The pH buffer may be included in the treatment fluids of the present invention to maintain pH in a desired range, inter alia, to enhance the stability of the treatment fluid. Examples of suitable pH buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, magnesium oxide, sulfamic acid, and the like. The pH buffer may be present in a treatment fluid of the present invention in an amount sufficient to maintain the pH of the treatment fluid at a desired level. One of ordinary skill in the art, with the benefit of this disclosure, will recognize the appropriate pH buffer and amount of pH buffer to use for a chosen application.

Optionally, the treatment fluids of the present invention further may include pH-adjusting compounds for adjusting the pH of the treatment fluid, inter alia, to a desired pH for the desired operation. Suitable pH-adjusting compounds include any pH-adjusting compound that does not adversely react with the other components of the treatment fluid. Examples of suitable pH-adjusting compounds include, but are not limited to, sodium hydroxide, potassium hydroxide, lithium hydroxide, sodium carbonate, potassium carbonate, fumaric acid, formic acid, acetic acid, acetic anhydride, hydrochloric acid, hydrofluoric acid, citric acid, hydroxyfluoboric acid, polyaspartic acid, polysuccinimide, ammonium diacetate, sodium diacetate, and sulfamic acid. The appropriate pH-adjusting compound and amount thereof may depend upon the formation characteristics and conditions, and other factors known to individuals skilled in the art with the benefit of this disclosure.

The treatment fluids of the present invention may comprise shale stabilizers. Examples of suitable shale stabilizers include, but are not limited to, long chain alcohols, polyols, amine inhibitor, sodium or potassium silicate, partially hydrolyzed polyacrylamides, polyalkene glycols, anionic surfactants, salt solutions containing, for example, sodium chloride, potassium chloride, or ammonium chloride; cationic polymers and oligomers, for example, poly(dimethyldiallylammonium chloride), cationic poly(acrylamide) and cationic poly(diemethylaminoethylmethacrylate). Generally, introducing the fluid containing the shale stabilizer into the portion comprises squeezing the fluid into the porosity of the portion of the subterranean formation so that the shale stabilizer acts to at least partially stabilize the portion of the subterranean formation, e.g., by reducing the propensity of shale present in the portion of the subterranean formation to swell or migrate.

Optionally the treatment fluids of the present invention may comprise polyols to aid in thinning or thickening the treatment fluid depending on the desired properties. Suitable polyols are those aliphatic alcohols containing two or more hydroxy groups. It is preferred that the polyol be at least partially water-miscible. Examples of suitable polyols that may be used in the aqueous-based treatment fluids of this invention include, but are not limited to, water-soluble diols such as ethylene glycols, propylene glycols, polyethylene glycols, polypropylene glycols, diethylene glycols, triethylene glycols, dipropylene glycols and tripropylene glycols, combinations of these glycols, their derivatives, and reaction products formed by reacting ethylene and propylene oxide or polyethylene glycols and polypropylene glycols with active hydrogen base compounds (e.g., polyalcohols, polycarboxylic acids, polyamines, or polyphenols). The polyglycols of ethylene generally are thought to be water-miscible at molecular weights at least as high as 20,000. The polyglycols of propylene, although giving slightly better grinding efficiency than the ethylene glycols, are thought to be water-miscible up to molecular weights of only about 1,000. Other glycols possibly contemplated include neopentyl glycol, pentanediols, butanediols, and such unsaturated diols as butyne diols and butene diols. In addition to the diols, the triol, glycerol, and such derivatives as ethylene or propylene oxide adducts may be used. Other higher polyols may include pentaerythritol. Another class of polyhydroxy alcohols contemplated is the sugar alcohols. The sugar alcohols are obtained by reduction of carbohydrates and differ greatly from the above-mentioned polyols. Combinations and derivatives of these are suitable as well.

The choice of polyol to be used is largely dependent on the desired density of the fluid. Other factors to consider include thermal conductivity. For higher density fluids (e.g., 10.5 ppg or higher), a higher density polyol may be preferred, for instance, triethylene glycol or glycerol may be desirable in some instances. For lower density applications, ethylene or propylene glycol may be used. In some instances, more salt may be necessary to adequately weight the fluid to the desired density. In certain embodiments, the amount of polyol that should be used may be from about 40% to about 99% by volume of the treatment fluid.

The treatment fluids of the present invention may comprise bridging agents. Preferably, when used, the bridging agents are either non-degradable, self-degrading or degradable in a suitable clean-up solution (e.g., a mutual solvent, water, an acid solution, etc.). Examples of bridging agents suitable for use in the methods of the current invention include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof. Examples of degradable bridging agents may include, but are not necessarily limited to, bridging agents comprising degradable materials such as degradable polymers. Specific examples of suitable degradable polymers include, but are not necessarily limited to, polysaccharides such as dextrans or celluloses; chitins; chitosans; proteins; orthoesters; aliphatic polyesters; poly(lactides); poly(glycolides); poly($\epsilon$-caprolactones); poly(hydroxybutyrates); poly(anhydrides); aliphatic polycarbonates; poly(orthoesters); poly(amino acids); poly(ethylene oxides); and polyphosphazenes. Combinations and derivatives of these are suitable as well. One suitable commercially available lightweight particulate is a product known as "BIO VERT" manufactured by Halliburton Energy Services, Inc. of Duncan, Oklahoma. BIO VERT is a polymer material comprising 90-100% polylactide and having a specific gravity of about 1.25.

When choosing a particular bridging agent to use, one should be aware of the performance of that bridging agent at the temperature range of the application. The bridging agents utilized may be generally present in the drilling fluid compositions in an amount in the range of from about 1% to about 40% by weight thereof, more preferably from about 5% to about 25%. Generally, the bridging agents may have a particle size in the range of from about 1 micron to about 600 microns. Preferably, the bridging particle size is in the range of from about 1 to about 200 microns but may vary from formation to formation. The particle size used is determined by the pore throat size of the formation.

The treatment fluids of the present invention also may comprise suitable fluid loss control agents. Any fluid loss agent that is compatible with the treatment fluids of the present invention is suitable for use in the present invention. Examples include, but are not limited to, microgels, starches, silica flour, gas bubbles (energized fluid or foam), benzoic acid, soaps, resin particulates, relative permeability modifiers, degradable gel particulates, diesel dispersed in fluid, and other immiscible fluids. Another example of a suitable fluid loss control additive is one that comprises a degradable polymer, such as those listed above. If included, a fluid loss additive should be added to a treatment fluid of the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid. For some liquid additives like diesel, these may be included in an amount from about 0.01% to about 20% by volume; in some embodiments, these may be included in an amount from about 1.0% to about 10% by volume.

In accordance with embodiments of the present invention, the treatment fluids of the present invention that comprise an associative polymer additive may be used in a variety of suitable applications. By way of example, the treatment fluids may be used in subterranean operations, including, but not limited to, drilling operations, underbalanced drilling operations, overbalanced drilling operations, acidizing operations, gravel-packing operations, fracturing operations, completion operations, and cementing operations. Among other things, the treatment fluids may be used in subterranean fluids as drilling fluids, drill-in fluids, cements, spacer fluids between different fluid types (cement and drilling fluid, for example), pills, viscous packer fluids for suspending well operations, high-viscosity sweep fluids to aid in cuttings transport, and the like. As a part of these operations, additional components may be added to the treatment fluid as would be apparent to one of ordinary skill in the art with the benefit of this disclosure. For example, proppant particulates may be added to the treatment fluid as part of a fracturing fluid useful in a fracturing operation. In another example, cement may be added along with certain cementing solids to the treatment fluid to form a cementing fluid useful in a cementing operation. As yet another example, the treatment fluid may comprise drill cuttings, including both macro and micro size cuttings, when the treatment fluid is used in conjunction with a drilling operation (e.g., as a drilling fluid, a drill-in fluid, etc.).

In one embodiment, the present invention provides a method comprising: providing a treatment fluid comprising an aqueous base fluid and an associative polymer additive, and placing the treatment fluid in a subterranean formation.

In one embodiment, the present invention provides a method comprising: providing a drilling fluid comprising an aqueous base fluid and an associative polymer additive; and using the drilling fluid to drill at least a portion of a well bore in a subterranean formation. Embodiments of the present invention may include circulating the drilling fluid in a well bore while drilling.

In some embodiments, where the treatment fluids of the present invention are used in a fracturing operation, a portion of the subterranean formation may be contacted with the treatment fluid so as to create or enhance one or more fractures therein, the treatment fluid comprising an associative polymer additive. The desired formulation of the treatment fluids would be determined to obtain desired rheology.

In other embodiments, wherein the treatment fluids of the present invention are used in a frac pack operation, a portion of the subterranean formation may be contacted with the treatment fluids so as to so as to create or enhance one or more fractures therein, the treatment fluids comprising an aqueous base fluid, an associative polymer additive, and a proppant particulate (e.g., gravel).

In other embodiments, the treatment fluids of the present invention may be placed into the well bore as a pill either prior to or after the stabilization of unconsolidated formation particulates in a section of the subterranean formation penetrated by the well bore. The desired volume of the treatment fluids of the present invention introduced into the well bore is based, among other things, on several properties of the section to be treated, such as depth and volume of the section, as well other physical properties of material in the section. The treatment fluid may reduce fluid loss into the formation from other fluids (e.g., carrier fluids or completion fluids) that may be introduced into the well bore subsequent to the treatment fluid and reduce the subsequent problems associated with water flowing into the well bore from the subterranean formation.

In another embodiment of the present invention, the treatment fluids may be placed into the subterranean formation as a viscosified pill during an underbalanced drilling operation. An underbalanced drilling operation may be referred to as a managed pressure drilling operation by some skilled in the art. Influxes from the formation may be experienced during an underbalanced drilling operation. Nitrogen may be used to combat this. The treatment fluids may be recovered by pumping gas into the formation to lift the pill out of the subterranean formation.

Another example of a method of the present invention comprises using the treatment fluids prior to a cementing operation. In one embodiment, such a method may comprise: providing a treatment fluid comprising an aqueous base fluid and an associative polymer additive; introducing the treatment fluid into a subterranean formation; allowing the treatment fluid to suspend and carry particulates from the well bore to the surface of a well site located above the subterranean formation; introducing a cement composition into the subterranean formation; and allowing the cement to set in the well bore. The set cement should have a tighter bond with the formation as a result.

To facilitate a better understanding of the present invention, the following representative examples of certain aspects of some embodiments are given. In no way should the following examples be read to limit, or define, the scope of the invention.

EXAMPLE 1

The following examples are submitted for the purpose of demonstrating the performance characteristics of the treatment fluids of the present invention. These tests were conducted substantially in accordance with the test methods described in ANSI/API RP 13B-2: Recommended Practice for Field Testing Oil-based Drilling Fluids unless stated otherwise.

A treatment fluid was prepared by adding 5% by weight of cement of an associative polymer additive comprising a hydrophobic ethoxylated aminoplast (OPTIFLO® L100 available from Southern Clay Products, Inc. of Austin, Tex.) and 0.5% by weight of cement of a fluid loss additive (Halad 344, available from Halliburton Energy Services, Inc. of Duncan, Okla.) to a 16 pound per gallon cement slurry (38.22% by weight of cement (bwoc) fresh water and 100% bwoc class H cement). A cement slurry without the hydrophobic ethoxylated aminoplast was also tested to provide comparative results. The results are provided in Tables 1 and 2.

TABLE 1

Rheological Profile of the Cement Mixture Without an Additive

| Model | YP (lb/100 ft$^2$) | Mu$_{inf}$ [PV] (cP) | K (lb-sec$^2$/ft$^2$) | m | n | R$^2$ | RUV* |
|---|---|---|---|---|---|---|---|
| Newtonian | 0.000 | 72.435 | | 1.000 | 1.000 | 0.8229 | 0% |
| Power | 0.000 | 39.047 | 0.0416 | 1.000 | 0.447 | 0.9665 | 2% |
| Bingham Plastic | 13.753 | 55.571 | | 1.000 | 1.000 | 0.9961 | 21% |
| GHB-2 | 8.667 | 27.966 | | 0.500 | 0.500 | 0.9962 | 27% |
| GHB-3 | 11.564 | 42.740 | | 0.708 | 0.708 | 0.9992 | 100% |

TABLE 1-continued

Rheological Profile of the Cement Mixture Without an Additive

| Model | YP (lb/100 ft$^2$) | Mu$_{inf}$ [PV] (cP) | K (lb-sec$^2$/ft$^2$) | m | n | R$^2$ | RUV* |
|---|---|---|---|---|---|---|---|
| GHB-4 | 11.565 | 42.744 | | 0.708 | 0.708 | 0.9992 | 100% |
| Herschel-Bulkley | 12.235 | 51.256 | 0.0028 | 1.000 | 0.859 | 0.9989 | 77% |

TABLE 2

Rheological Profile of the Cement Mixture With an Associative Polymer Additive

| Model | YP (lb/100 ft$^2$) | MU$_{inf}$ [PV] (cP) | K (lb-sec$^2$/ft$^2$) | m | n | R$^2$ | RUV* |
|---|---|---|---|---|---|---|---|
| Newtonian | 0.000 | 575.383 | | 1.000 | 1.000 | 0.9654 | 0% |
| Power | 0.000 | 652.376 | 0.0360 | 1.000 | 0.774 | 1.0000 | 100% |
| Bingham Plastic | 14.007 | 515.267 | | 1.000 | 1.000 | 0.9925 | 0% |
| GHB-2 | 3.848 | 403.336 | | 0.500 | 0.500 | 0.9980 | 2% |
| GHB-3 | 0.050 | 187.057 | | 0.200 | 0.200 | 0.9996 | 8% |
| GHB-4 | 0.010 | 652.269 | | 1.000 | 0.774 | 1.0000 | 99% |
| Herschel-Bulkley | 0.010 | 652.269 | 0.0359 | 1.000 | 0.774 | 1.0000 | 99% |

As can be seen from the results in Tables 1 and 2, the addition of the associative polymer additive increased the PV from approximately 56 cP to over 500 cP while only changing the YP from about 13.8 to about 14.0 lb/100 ft$^2$. Further observation of the fluid during testing showed that the cement without the associative polymer additive exhibited settling while the cement with the associative polymer additive did not. The results in Tables 1 and 2 also demonstrate that the modified fluid may be represented by a power law rheological model rather than the more complex Bingham Plastic model.

EXAMPLE 2

A second experiment was conducted using a second associative polymer additive (OPTIFLO® H370VF available from Southern Clay Products, Inc. of Austin, Tex.) in a light weight cement slurry. In this case, a neat 12 lb/gal cement was used as the base fluid for comparison. The associative polymer additive is listed as a shear thinning viscosity modifying additive. Five slurries were created with associative polymer additive concentrations ranging from 0 to 3% by weight of cement. The experimental slurry component list is shown in Table 3.

TABLE 3

| Slurry Compositions | | | | | |
|---|---|---|---|---|---|
| | Slurry #1 | Slurry #2 | Slurry #3 | Slurry #4 | Slurry #5 |
| Water | 245.0 | 240.3 | 235.6 | 226.1 | 216.7 |
| Cement Class A | 200.0 | 200.0 | 200.0 | 200.0 | 200.0 |
| optiflo H370VF | | 5.7 | 11.4 | 22.9 | 34.3 |
| optiflo % | control | 0.5 | 1.0 | 2.0 | 3.0 |
| Density | 12 lb/gal | 12 lb/gal | 12 lb/gal | 12 lb/gal | 12 lb/gal |
| Total Fluid | 13.84 gal/sk | 13.84 gal/sk | 13.84 gal/sk | 13.84 gal/sk | 13.84 gal/sk |

The slurry compositions were then tested for their rheology properties using ANSI/API RP 10B: Recommended Practice for Field Testing Oil-based Drilling Fluids. In addition, samples were prepared and allowed to rest in graduated flasks for 2 hours. The percentage of free water was then measured as the portion of water at the top of the flask relative to the total fluid volume. The resulting rheological properties and free water measurements are shown in Table 4.

TABLE 4

| Slurry Rheology and Free Water Measurements | | | | | |
|---|---|---|---|---|---|
| RPM | | | | | |
| 600 | 12 | 10 | 24 | 90 | peg |
| 300 | 6.5 | 6 | 14 | 54 | 307 |
| 200 | 4.5 | 4.5 | 10 | 38 | 214 |
| 100 | 3 | 4 | 5 | 21 | 115 |
| 60 | 2 | 3.5 | 4 | 13 | 72 |
| 30 | 2 | 1.5 | 3 | 8 | 37 |
| 6 | 1 | 1 | 1 | 2 | 9 |
| 3 | 0.5 | 1 | 1 | 2 | 6 |
| free water % | 33 | 35 | 20 | 1 | 0 |

As can be seen in Table 4, the standard API free water test results for the slurries containing the associative polymer additive demonstrated a reduction in the free water percentages even though the 3 and 6 RPM Fann readings were below 10. As one or ordinary skill in the art would recognize, these results indicate that slurries prepared with an associative polymer additive will demonstrate a low YP, while still being capable of providing extremely good particulate suspension.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A treatment fluid comprising:
   an aqueous liquid and an associative polymer additive, wherein the associative polymer additive comprises a hydrophobic alkoxylated aminoplast polymer having at least one alkenyl unit as part of the hydrophobic modification;
   wherein the associative polymer additive increases the plastic viscosity (PV) of an aqueous liquid by more than at least 50% and wherein the associative polymer additive increases the yield point (YP) by no more than about 30% of the corresponding increase in the PV relative to an aqueous liquid without the associative polymer additive;
   wherein the associative polymer additive comprises hydrophobic segments and wherein the hydrophobic segments on the associative polymer additive comprise from 10% to 40% by weight of the total associative polymer; and,
   wherein the viscosity of the aqueous liquid comprising the associative polymer additive is capable of maintaining a viscosity of greater than about 20 cP for at least 20 minutes at temperatures higher than about 275° F.

2. The treatment fluid of claim 1 wherein the aqueous liquid is selected from the group consisting of fresh water, salt water, brine, seawater, and any combinations thereof.

3. The treatment fluid of claim 1 wherein the associative polymer additive is present in from 0.01% to 15% by volume of the treatment fluid.

4. The treatment fluid of claim 1 wherein the treatment fluid further comprises an additive selected from the group consisting of a surfactant, a bridging agent, a polyol, a fluid loss control agent, a pH-adjusting agent, a pH buffer, a shale stabilizer, or a combination thereof.

5. The treatment fluid of claim 1 wherein the treatment fluid is suitable for use as a drilling fluid, a drill-in fluid, a cement, a fracturing fluid, a spacer fluid, a viscous packer fluid, or a high-viscosity sweep fluid.

6. The treatment fluid of claim 1 wherein the treatment fluid comprises a cement and wherein the associative polymer additive decreases the formation of free water by at least about 30% relative to a treatment fluid comprising a cement without the associative polymer additive.

7. A treatment fluid comprising:
an aqueous liquid and an associative polymer additive comprises a hydrophobic alkoxylated aminoplast polymer having at least one alkenyl unit as part of the hydrophobic modification,
wherein the associative polymer additive increases the plastic viscosity (PV) of an aqueous liquid by more than at least 50% and wherein the associative polymer additive increases the yield point (YP) by no more than about 30% of the corresponding increase in the PV relative to an aqueous liquid without the associative polymer additive;
wherein the associative polymer additive comprises hydrophobic segments and wherein the hydrophobic segments on the associative polymer additive comprise from 10% to 40% by weight of the total associative polymer; and,
wherein the viscosity of the aqueous comprising the associative polymer additive is capable of maintaining a viscosity of greater than about 20 cP for at least 20 minutes at temperatures higher than about 275° F.

8. The treatment fluid of claim 7 wherein the aqueous liquid is selected from the group consisting of fresh water, salt water, brine, seawater, and any combinations thereof.

9. The treatment fluid of claim 7 wherein the associative polymer additive is present from 0.01% to 15% by volume of the treatment fluid.

10. The treatment fluid of claim 7 wherein the treatment fluid further comprises an additive selected from the group consisting of a surfactant, a bridging agent, a polyol, a fluid loss control agent, a pH-adjusting agent, a pH buffer, a shale stabilizer, or a combination thereof.

11. The treatment fluid of claim 7 wherein the treatment fluid is suitable for use as a drilling fluid, a drill-in fluid, a cement, a fracturing fluid, a spacer fluid, a viscous packer fluid, or a high-viscosity sweep fluid.

* * * * *